United States Patent [19]

Ando

[11] Patent Number: 4,716,283

[45] Date of Patent: * Dec. 29, 1987

[54] OPTICAL HEAD FOR FOCUSING A LIGHT BEAM ON AN OPTICAL DISK

[75] Inventor: Hideo Ando, Hino, Japan

[73] Assignee: Kabushiki Kaisha Toshiba, Kawasaki, Japan

[*] Notice: The portion of the term of this patent subsequent to Jun. 4, 2002 has been disclaimed.

[21] Appl. No.: 742,396

[22] Filed: Jun. 7, 1985

[30] Foreign Application Priority Data

Jun. 12, 1984 [JP] Japan .................. 59-120373

[51] Int. Cl.[4] ............................... G01J 1/20
[52] U.S. Cl. ........................ 250/201; 369/45; 369/46
[58] Field of Search ............... 250/201 DF, 204; 369/44, 45, 46; 358/342; 354/406, 402

[56] References Cited

U.S. PATENT DOCUMENTS

| | | | |
|---|---|---|---|
| 4,059,841 | 11/1977 | Bricot et al. | 358/128 |
| 4,079,248 | 3/1978 | Lehureau et al. | 250/201 |
| 4,378,491 | 3/1983 | Lehman | 369/45 |
| 4,390,781 | 6/1983 | Musha | 369/45 |
| 4,542,492 | 9/1985 | Leterme et al. | 369/45 |

Primary Examiner—Edward P. Westin
Assistant Examiner—Charles F. Wieland
Attorney, Agent, or Firm—Cushman, Darby & Cushman

[57] ABSTRACT

In an optical head for focusing a light beam on an optical disk, a collimated laser beam is focused on the optical disk by an objective lens and is reflected from the optical disk. The reflected laser beam is directed to the prism through the objective lens and is refracted by the prism so that a beam width of the laser beam emerged from the prism is reduced. Part of the laser beam emerged from the prism is shielded by a shield plate and the other part of the laser beam is directed to a photodetector for detecting a focusing state of the objective lens.

20 Claims, 16 Drawing Figures

OPTICAL HEAD FOR FOCUSING A LIGHT BEAM ON AN OPTICAL DISK

BACKGROUND OF THE INVENTION

The present invention relates to an optical head and method for focusing an optical beam on an information recording medium such as an optical disk, to record information on, reproduce it from, or erase it from, the information recording medium and, more particularly, to a system for detecting the displacement of the focal point of the optical head.

Recently, various systems for recording information on an information recording medium, e.g., an optical disk, have been developed. In each system, a beam spot corresponding to the waist of a light beam converged by an objective lens of an optical head must be formed on the optical disk to record information on, reproduce it from, or erase it from, the optical disk. The optical head has a system for detecting the focusing condition of the objective lens. A focusing condition detecting system which employs a so-called "knife edge method" is disclosed in U.S. Patent Application Ser. No. 399,873 filed on July 19, 1982 by the same assignee as the present application, corresponding to EPC Application No. 82106508.3 filed on July 19, 1982, now U.S. Pat. No. 4,521,680. The detecting system has a light shielding plate, provided between the data recording surface of an optical disk and a photodetector having two photosensing regions, to shield a part of a light beam reflected from the data recording surface and to allow the passage of another part of the light beam. The remaining part of the light beam is applied to the photosensitive regions of the photodetector. When the light beam is accurately focused on the optical disk, the photosensing regions generate electrical signals of the same level. When the beam is inaccurately focused on the optical disk, the photosensing regions output electrical signals of different levels. It can thus be determined from these signals whether or not the light beam has been accurately focused on the optical disk.

The accuracy of determining the focusing condition is proportional to the lateral magnification of the beam spot formed on the photosensor, which corresponds to the waist of the light beam which is formed on the optical disk. As long as the same objective lens having a fixed focal distance is used, the lateral magnification is inversely proportional to the angular aperture of the projection lens used to converge the light beam on the photodetector, and directly proportional to the focal distance of this projection lens. Hence, to raise the accuracy of determining the focusing condition, it suffices to use the focusing lens having a long focal distance. However, the longer the focal distance, the longer the light path of the optical system of the optical head, and the larger the optical head.

SUMMARY OF THE INVENTION

The object of the present invention is to provide a compact optical head with a system which can determine with great sensitivity whether or not a light beam has been accurately focused on an information recording medium.

According to the invention, there is provided an optical head and method for focusing a light beam on an information recording layer, comprising: a light source for emitting a light beam; an objective lens for converging the light beam emitted from the light source, applying the light beam to the information recording layer and transferring the light beam reflected from the information recording layer, said light beam forming a beam spot corresponding to its beam waist on the information recording layer when it is accurately focused on the information recording layer, and forming a larger beam spot on the information recording layer when it is inaccurately focused on the information recording layer; means for reducing the width of the light beam along its optical axis as the light beam is transferred from the objective lens; means for converging the light beam having the reduced diameter; a first photodetecting means with first and second photosensitive regions on which the transferred light beam is applied; and means for deflecting the transferred light beam in accordance with the distance between the objective lens and information recording layer, thereby applying the light beam to the first and second photosensitive regions when it is accurately focused on the information recording layer and to either the first or second photosensitive region when it is inaccurately focused on the information recording layer.

DETAILED DESCRIPTION OF THE PREFERRED EMBODIMENTS

Figure 1:
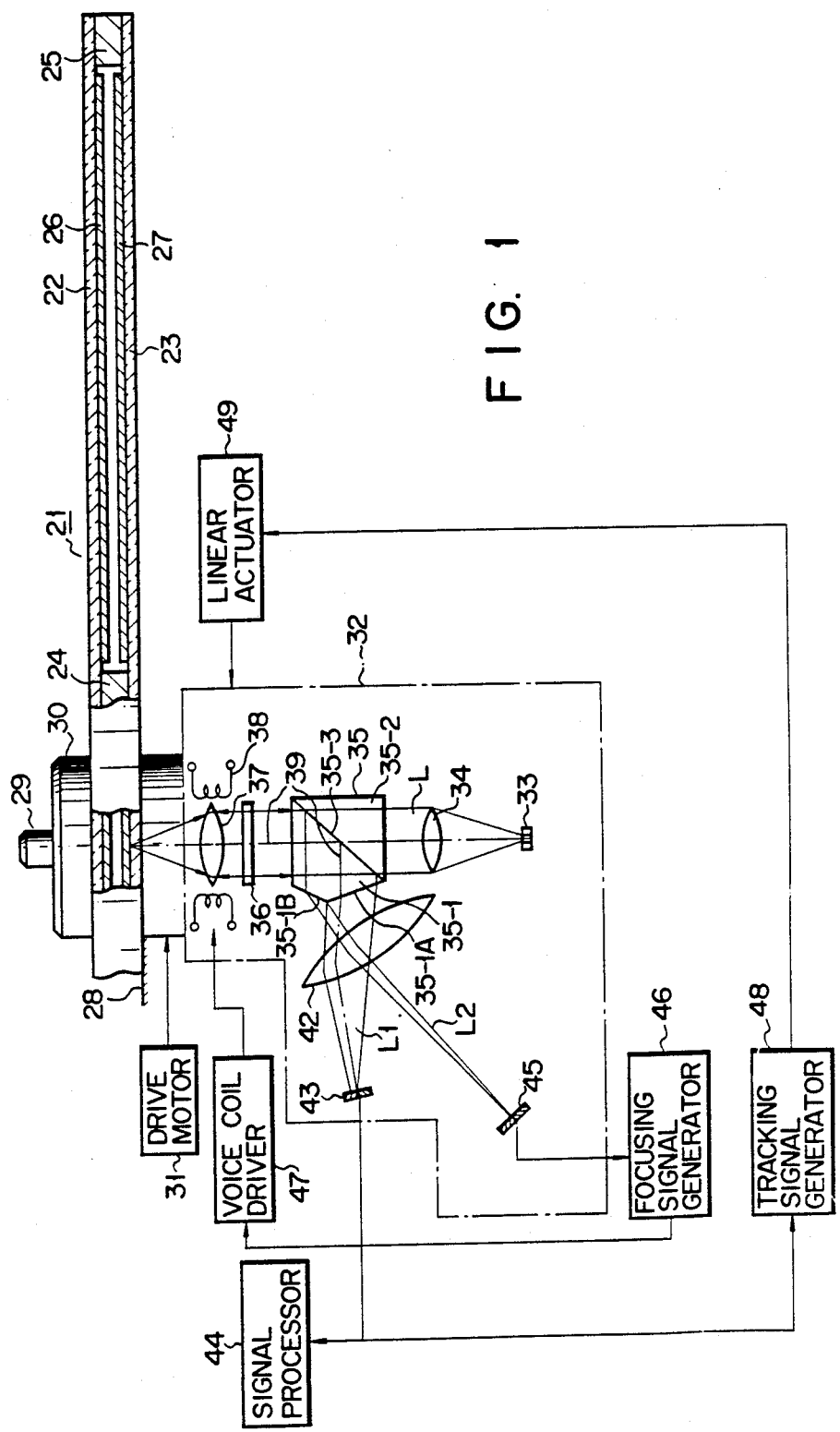
FIG. 1 is a block diagram of an optical head according to an embodiment of the present invention.

FIG. 1 schematically shows an optical disk 21 and an optical head 32 according to the present invention. As shown in this Figure, disk 21 is made up of a pair of transparent disks 22 and 23, an inner spacer 24, an outer spacer 25, and two light-reflecting layers 26 and 27. Spacers 24 and 25 are interposed between disks 22 and 23, spacing these disks and holding them parallel to each other. Layer 26 is vapor-deposited on the inner surface of transparent disk 22, and the layer 37 is vapor-deposited on the inner surface of transparent disk 23. Layers 26 and 27 are information recording layers. A helical tracking guide is formed on each of these layers. Pits are cut in layers 26 and 27 along the tracking guides record information on these layers.

Optical disk 21 has a center hole. When disk 21 is put on a turntable 28, the spindle 29 of turnable 28 is inserted in this hole, axially aligning disk 21 with turntable 28 as shown in FIG. 1. After disk 21 has been coaxially set on turntable 28, a chuck 30 is mounted on spindle 29, thereby securing disk 21 to turntable 28. Turntable 28 is rotatably supported by a base (not shown). A motor 31 rotates turntable 28 at a constant speed.

Optical head 32 can be moved by a linear actuator 49 in the radial direction of optical disk 21. Head 32 contains a semiconductor laser 33 for emitting a laser beam L. To write informtion on optical disk 21, laser 33 emits a beam L having the intensity modulated in accordance with the information. To read information from disk 21, laser 33 emits a beam of a specified intensity. Laser beam L is converted by a collimator lens 34 to a parallel laser beam L, which is applied to a polarizing beam splitter 35. Beam L passes through a quarter-wave plate 36 and is applied to an objective lens 37. Lens 37 focuses beam L on the layer 27 of disk 21. Lens 37 is supported by a voice coil 38, movable along its own optical axis. When lens 37 is in a neutral position, it accurately focuses beam L, thus forming the smallest beam spot corresponding to the beam waist of beam L on light-reflecting layer 27. In this accurate focusing state, optical head 32 can form pits along the helical tracking guide, thereby writing information on disk 21, or can receive beam L whose intensity has been modulated by the pits, thereby reading the information from disk 21.

The diverging laser beam reflected from the light-reflecting layer 27 of optical disk 21 is converted by objective lens 37 to a parallel laser beam L when beam L has been accurately focused on layer 27. Parallel beam L passes through quarter-wave plate 36 and is applied to beam splitter 35. As beam L passes twice through quarter-wave plate 36, its polarization plane rotates 90°. As shown in FIG. 1, beam splitter 35 is comprised of two prisms 35-1 and 35-2 which are combined together. The interface between these prisms is a polarization plane 35-3. Unlike in the ordinary polarizing beam splitter, prism 35-1 splits the laser beam reflected from layer 27 into two parts and emits these parts from two laser beam emerging surfaces 35-1A and 35-1B. Surfaces 35-1A and 35-1B are inclined at different angles to the common optical axis 39 of lenses 34 and 37. Laser beam L reflected from polarizing plane 35-3 passes through prism 35-1. That part of beam L which reaches surface 35-1A is deflected upwardly (FIG. 1) and emitted from prism 35-1 as a laser beam $L_1$. The remaining part of beam L which reaches surface 35-1B is deflected downward (FIG. 1) and emitted from prism 35-1 as a laser beam $L_2$. Hence, beams $L_1$ and $L_2$ are directed in different directions. Needless to say, beams $L_1$ and $L_2$ are more slender than beam L passing through prism 35-1. They are then converged by a projection lens 42. Converged beam $L_1$ is applied to a photodetector 45 for detecting the focusing state, and converged beam $L_2$ is applied to a photodetector 43 for detecting the information and the tracking guide.

Photodetector 45 is placed in the image forming plane on which the optical system forms the beam spot corresponding to the waist of beam L when objective lens 37 accurately focuses beam L on light-reflecting layer 27. In other words, photodetector 45 is positioned at the back focal point of projection lens 42. On the other hand, the photodetector 43 is placed in a far field plane.

Figure 2A:
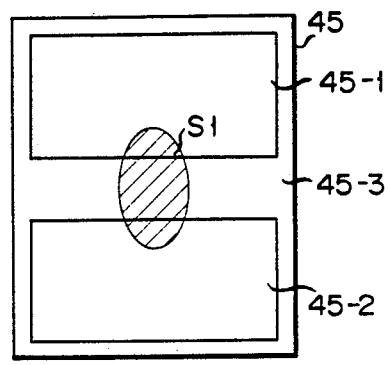
FIGS. 2A to 2C show how a beam spot is formed on a focusing condition photodetector when a laser beam is accurately focused on an information recording medium, and when it is inaccurately focused on the medium.
Figure 2B:
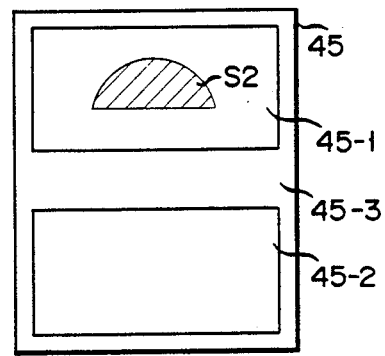
Figure 2C:
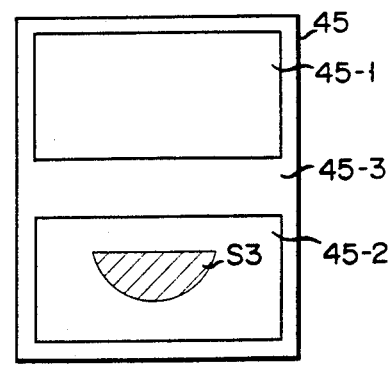

As shown in FIG. 2A, photosensor 45 has two photosensitive regions 45-1 and 45-2 with a photo-insensitive region 45-3 provided between these photosensitive regions. Regions 45-1 and 45-2 produce electrical signals upon receiving light. Photodetector 45 is coupled to a focus signal generator 46 for generating a focus signal representing the difference in level between the signals from regions 45-1 and 45-2, which is supplied to a voice coil driver 47. When laser beam L is accurately focused on light-reflecting layer 27, beam $L_1$ is mostly applied to region 45-3, forming the smallest beam spot S1 as shown in FIG. 2A; two small parts of spot S1, substantially equal in size, are formed on photosensitive regions 45-1 and 45-2. In this case, signal generator 46 outputs a focus signal at zero level. Voice coil driver 47 remains to drive voice coil 38, whereby objective lens 37 is held in the neutral position. When objective lens 37 is too close to light-reflecting layer 27, beam $L_1$ is applied more to region 45-1 than to region 45-2, forming a large spot S2 mostly on region 45-1 as shown in FIG. 2B. Hence, signal generator 46 generates a focus signal at a minus level. In response to this signal, voice coil driver 47 drives voice coil 38, whereby objective lens 37 is moved away from light-reflecting layer 27 to the neutral position, thus accurately focusing beam L on layer 27. In contrast, when objective lens 37 is too far from light-reflecting layer 27, beam $L_1$ is applied more to region 45-2 than to region 45-1, forming a large spot S3 mostly on region 45-2 as shown in FIG. 2C. Hence, signal generator 46 generates a focus signal at a minus level. In response to this signal, voice coil driver 47 drives voice coil 38, whereby objective lens 37 is moved from light-reflecting layer 17 until it reaches the neutral position, thus accurately focusing beam L on layer 27.

Figure 3A:
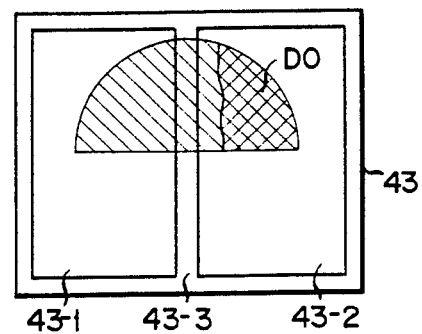
FIGS. 3A to 3C illustrate how a beam spot is formed on a photodetector for detecting a tracking guide when a laser beam accurately traces the tracking guide formed on the information recording medium, and when it inaccurately traces the tracking guide.
Figure 3B:
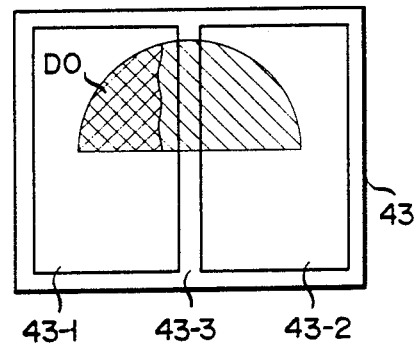
Figure 3C:
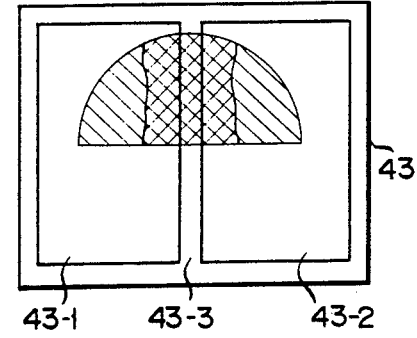

Photodetector 43 placed in the far field plane has two photosensitive regions 43-1 and 43-2 with a photo-insensitive region 43-3 provide between regions 43-1 and 43-2, as illustrated in FIG. 3A. Laser beam $L_2$ converged by projection lens 42 is applied to photodetector 43, forming a spot S4 larger than the smallest spot S1 even if objective lens 37 accurately focuses laser beam L on light-reflecting layer 27. A signal processor 44 is coupled to photosensitive regions 43-1 and 43-2. A tracking signal generator 48 is coupled to photosensitive regions 43-1 and 43-2. When laser beam L is accurately focused on light-reflecting layer 27, a beam spot S4 is formed on photodetector 43 as shown in FIG. 3C. Spot S4 has a darker portion DO, i.e., a diffractive image of the tracking guide of optical disk 21. Portion DO is formed on both photosensitive regions 43-1 and 43-2, occupying substantially the same area of either photosensitive region. Regions 43-1 and 43-2 generate electrical signals. Signal processor 44 adds these signals, thus generating signals showing the information recorded on layer 27. Signal generator 48 generates a tracking signal corresponding to the difference between these electrical signals. The difference is in effect zero, and the tracking signal at zero level is fed to a linear actuator 49. Since the tracking signal is at zero level, actuator 49 does not move optical head 32 at all. When laser beam L fails to trace the tracking guide, portion DO of spot S4 is on region 43-1 as shown in FIG. 3B or region 43-2 as shown in FIG. 3A. In the case of FIG. 3B, signal generator 48 generates a focus signal at a positive level. In the case of FIG. 3A, it outputs a tracking signal at a negative level. The tracking signal is supplied to linear actuator 49, which moves optical head 32 in the direction parallel to layer 27 until beam L comes to accurately trace the tracking guide.

Beam $L_1$ is thinner than the beam which reflected from polarization plane 35-3 and reaches beam emerging surface 35-1B. Similarly, beam $L_2$ is thinner than the beam which reflected from polarization plane 35-3 and reaches beam emerging surface 35-1A. Each of the beams $L_1$, $L_2$ has an elongated cross sectional shape which extends in a direction substantially perpendicular to the direction to which the image of the tracking guide is extended. This enables the optical system of head 32 to accurately detect the focusing state. The reason why so will be described with reference to FIG. 4 showing the optical system.

Figure 4:
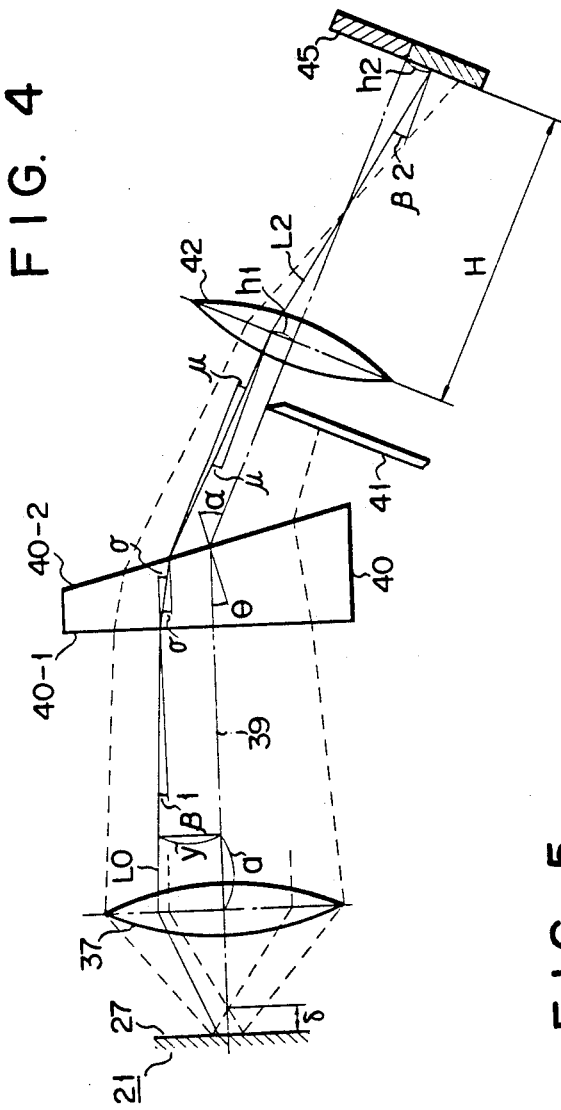
FIG. 4 schematically shows the focusing state detecting means shown in FIG. 1.

As shown in FIG. 4, a prism 40 and a light shield 41 are arranged in the optical path between objective lens 37 and projection lens 42. Prism 40 refracts a laser beam $L_0$, and shield 41 shields the lower half of the section of beam $L_0$. When laser beam L is accurately focused on light-reflecting layer 27, a parallel beam L travels from lens 37 to lens 42. Prism 40 and shield 41 function almost in the same way as the prism 35-1 of polarizing beam splitter 35.

Figure 5:
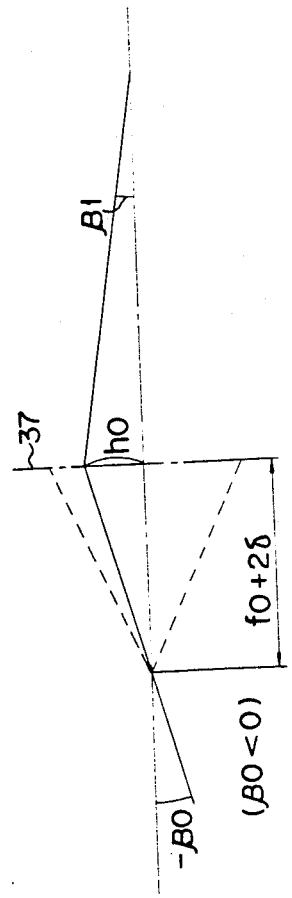
FIG. 5 shows how a laser beam is processed in the objective lens system used in the means of FIG. 4.

An image forming system of objective lens 32 is schematically illustrated in FIG. 5. In this figure, $f_0$ is the focal distance of objective lens 37, and $\delta$ is the distance between the position which lens 37 takes when beam L is accurately focused on light-reflecting layer 27 and the position which beam L takes when beam L is not accurately focused on layer 27. The line shown in FIG. 5 is a ray which extends from layer 27, passes through a point on the main surface of lens 37 located at distance $h_0$ from the optical axis of the optical system, and refracted by lens 37 toward the optical axis of the optical system. Obviously, $\delta = 0$ when beam L is accurately focused on layer 27. When beam L is not accurately focused on layer 27 and optical head 32 is moved toward disk 21 for distance $\delta$, the waist of beam L, which is formed as beam L is reflected from light-reflecting layer 27, is located at the distance of $2\delta$ from objective lens 37. On the other hand, when beam L is not accurately focused on layer 27 and optical head 32 has moved away disk 21 for distance $\delta$, beam L is reflected from layer 27 after forming a beam waist behind layer 27. Hence, the beam waist of beam L is located at the distance of $2\delta$ from objective lens 37. In other words, when optical head 32 is moved for distance $\delta$, the distance between the beam waist and the main surface of lens 37 is $f_0 + 2\delta$ as is evident from FIG. 5. If the beam waist is regarded as a point, angles $\beta_0$ and $\beta_2$ will be given by following equations (1) and (2):

$$\frac{h_0}{f_0 + 2\delta} = \tan(-\beta_0) = -\beta_0 \quad (1)$$

From the formula applicable to the image-forming of a lens:

$$\frac{\tan(-\beta_0)}{h_0} + \frac{\tan(\beta_1)}{h_0} = \frac{1}{f_0}$$

Therefore:

$$\beta_1 = \beta_0 + h_0/f_1 = \frac{h_0}{f_0 + f_0^2/2\delta} \quad (2)$$

Figure 6:
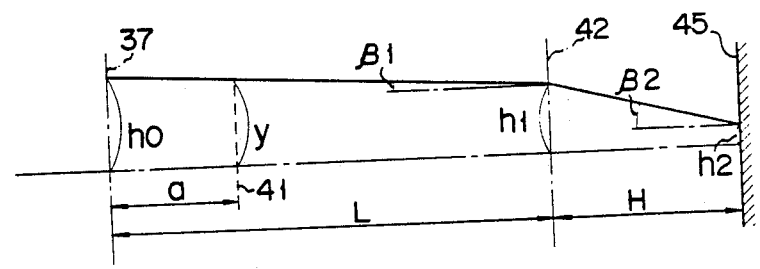
FIG. 6 shows how a laser beam is processed in the projection lens system used in the means of FIG. 4.

If prism 40 were not provided in the optical system of FIG. 4, the ray shown in FIG. 5 would be as shown in FIG. 6. From the locus of the ray, which is illustrated in FIG. 6, the deflection $h_2$ of the laser beam spot is formed on photodetector 45. In FIG. 6, a is the distance between the main surface of objective lens 37 and light shield 41, L is the distance between the main surface of objective lens 37 and that of projection lens 42, H is the distance between the main surface of projection lens 42 and the light-receiving surface of photodetector 45, and y is the distance between the ray and the optical axis of lenses 37 and 42. Let us assume that projection lens 42 has a focal distance $f_1$. Distance y is given as follows:

$$y = h_0 - a\beta_1 = h_0\left(1 - a \cdot \frac{1}{f_0 + f_0^2/2f}\right) \quad (3)$$

If $F(\delta) = (f_0 + f_0/2\delta)^{-1}$, equation (3) will reduce to:

$$y = h_0(1 - aF(\delta)) \quad (4)$$

Hence:

$$h_0 = \frac{y}{1 - aF(\delta)} \quad (5)$$

The distance $h_1$ between the optical axis and the point on the main surface of lens 42, where the ray passes, is given by the following equation:

$$h_1 = y - (L-a)\beta_1 \quad (6)$$
$$= \frac{1 - LF(\delta)}{1 - aF(\delta)} \times y$$

Angle $\beta_2$ is given as follows:

$$\beta_2 = \beta_1 + \frac{h_1}{f_1} \quad (7)$$
$$= \frac{y}{1 - aF(\delta)}\{1/f_1 + (1 - L/f_1)F(\delta)\}$$

The distance $h_1$ between the optical axis and the point on the light-receiving surface of photodetector 45, where the ray passes, is given by the following equation:

$$h_1 = h_1 - H\beta_2 \quad (8)$$
$$= \frac{y}{1 - aF(\delta)}\{(1 - H/f_1) - [H + L(1 - H/f_1)] \cdot F(\delta)\} \cdot F(\delta)$$

When $\delta = 0$, that is, when laser beam L is accurately focused on light-reflecting surface 27, $h_2 = 0$. The condition for satisfying this in equation (8) is:

$$H = f_1 \quad (9)$$

Hence, equation (8) reduces:

$$h_2 = \frac{y}{1 - aF(\delta)} \times (-f_1)F(\delta) \quad (10)$$
$$= -\frac{f_1 y}{f_0 - a + f_0^2/2\delta}$$

The lateral magnification m of the spot formed on the light-receiving surface of photodetector 45 when beam L is accurately focused on layer 27 is expressed as:

$$m = -\beta_0/\beta_2 \quad (11)$$

From equations (1), (5) and (7), it is obvious that equation (11) is changed to:

$$m = +f_1/f_0 \quad (12)$$

Hence, equation (10) is rewritten as follows:

$$h_2 = -\frac{f_0 my}{f_0 = a + f_0^2/2\delta} \quad (13)$$

It has been assumed that in the optical system of FIG. 5, the beam waist of beam is located at the focal point of objective lens 37. When a diverging or converging laser beam is applied to objective lens 37, the waist of this beam is formed at a distance b from the focal point of lens 37. In this case, distance $h_2$ can be found by similar calculations, substituting $2\delta+b$ for $2\delta$ and assuming that the whole optical system is one combination lens. That is:

$$h_2 = \pm \frac{2my}{f_0 + (1 - 4/f_0)(2\delta + b)} \cdot \delta \quad (14)$$

Here, when a=0, $$h_2 = \pm \frac{2my}{f_0 + b + 2\delta} \cdot \delta \quad (15)$$

When $f_0+b$ is much greater than $2\delta$, $$h_2 \approx \pm \frac{2my}{f_0 + b} \cdot \delta \quad (16)$$

In equations (14)-(16), sign "+" indicates an upright image and sign "−" indicates an inverted image.

Equations (13) and (16) clearly show that the accuracy of determining the focusing condition in the optical systems of FIGS. 5 and 6 is proportional to the lateral magnification m.

Figure 7:
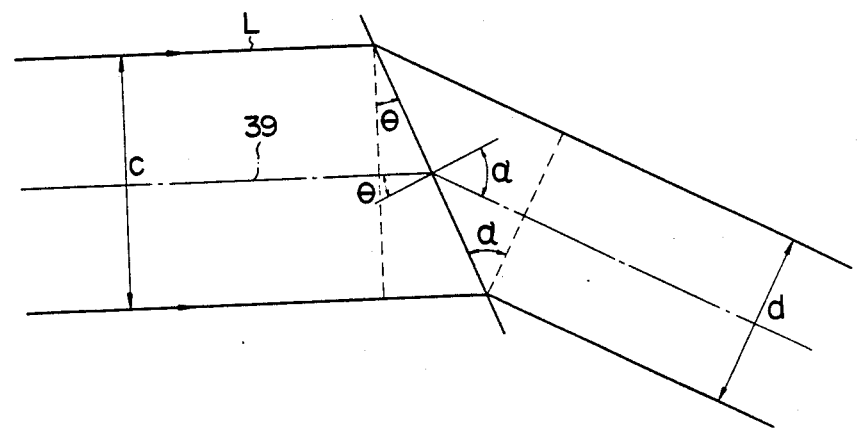
FIG. 7 illustrates how a laser beam is processed in the prism system used in the means of FIG. 4.

It will now be described how a laser beam travels in the optical system (FIG. 4) having prism 40, with reference to FIGS. 4 and 7. When laser beam L is accurately focused on light-reflecting layer 27, the parallel laser beam $L_0$ having a diameter c is at the right angles to the input surface 40-1 of prism 40. It is refracted as it emerges from the output surface 40-2 of prism 40. As a result, the diameter c of beam $L_0$ is reduced to a diameter d. Let us assume that an axis perpendicular to surface 40-2 is inclined at an retraction angle $\theta$ to the axis 39 of beam $L_0$, and at an incident angle $\alpha$ to the axis of the beam coming out of surface 40-2, the following is established:

$$c/d = \cos\theta/\cos\alpha = M \quad (17)$$

Based on the Snell laws of refraction, the following equation is also established:

$$\sin\alpha = n \cdot \sin\theta \quad (18)$$

where n is the refractive index of prism 40.

When the surface of layer 27 is at a distance of $\delta$ from the focal point of objective lens 37 as shown in FIG. 4, the angle $\beta_1$ at which beam $L_0$ is incident on the input surface 40-1 of prism 40 is expressed as:

$$\beta_1 = \frac{y}{(f_0 + a) + f_0^2/2\delta} \quad (19)$$

This will be clearly understood from equations (2) and (5). Further, the angle $\sigma$ at which beam $L_0$ is incident on the prism surface 40-2 is given as follows, provided both $\beta_1$ and $\sigma$ are very small:

$$\sigma = \beta_1/n = \frac{y}{n\{(f_0 - a) + f_0^2/2\delta\}} \quad (20)$$

According to the Snell laws of refraction, refractive index n of prism 40 is:

$$n = \frac{\sin(\alpha + \mu)}{\sin(\theta + \sigma)} = \frac{\sin\alpha \cos\mu + \sin\mu \cos\alpha}{\sin\theta \cos\sigma + \sin\sigma \cos\theta} \quad (21)$$

When angles $\sigma$ and $\mu$ are negligibly small, $\cos\mu \approx \cos\sigma \approx 1$, $\sin\sigma \approx \sigma$, and $\sin\mu \approx \mu$. Then, the following derives from equation (17):

$$\mu = n\left(\tan\alpha \times \frac{\sin\theta}{\sin\alpha} + \sigma M\right) - \tan\alpha \quad (22)$$

Substituting equation (18) in equation (22), we obtain:

$$\mu = nM\sigma = \frac{My}{(f_0 - a) + f_0^2/2\delta} \quad (23)$$

The deflection $h_2$ of laser beam spot formed on photodetector 45 is calculated by substituting u for $\mu_1$ in equations (7) and (8) and by using equation (9). Hence:

$$h_2 = h_1 - f_1\beta_2 \quad (24)$$
$$= h_1 - f_1(\mu + h_1/f_1)$$
$$= -f_1\mu$$
$$= \frac{M(f_1 my)}{(f_0 - a) + f_0^2/2\delta}$$

Substituting this value in equation (12), we obtain:

$$h_2 = \frac{M(f_0 my)}{f_0 - a + f_0^2/2\delta} \quad (25)$$

The comparison of equations (12) and (24) shows the optical system (FIG. 4) with prism 40 can detect focusing M times more accurately than the optical system (FIG. 5) without prism 40.

In the optical system of FIG. 4, prism 40 refracts laser beam $L_0$ and slightly reduces the diameter of this beam, thus increasing the size of the beam spot formed on photodetector 45 for determining the focusing condition of head 32. Alternatively, projection lens 42 may be replaced by another of a shorter focal distance, making the optical system smaller and lighter without damaging the accuracy of determining the focusing condition.

Figure 8:
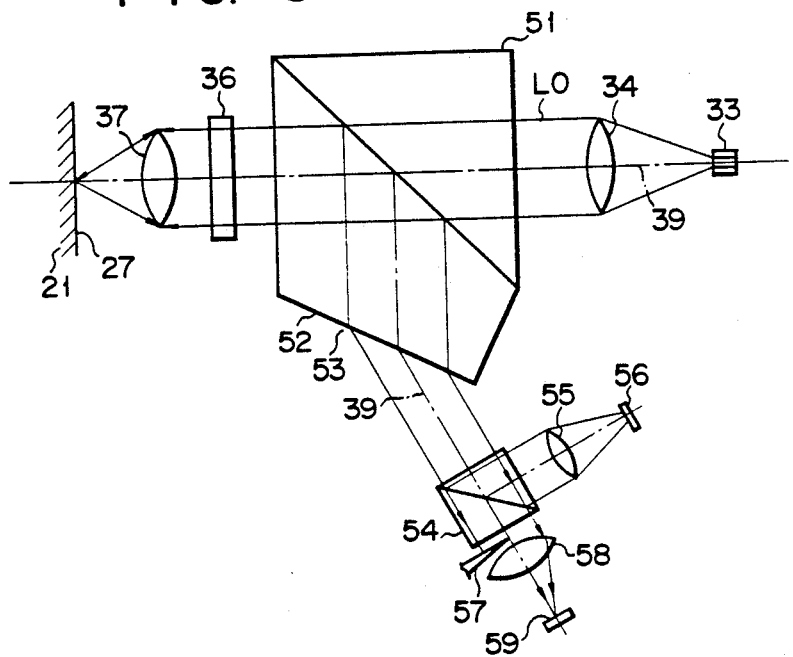
FIGS. 8 to 12 show the optical systems of the other embodiments of this invention.

FIG. 8 shows the second embodiment of the present invention. In this embodiment, a polarizing beam splitter 51 has a prism 53 which refracts an input laser beam $L_0$ but does not split beam $L_0$ into two beams. The diameter of beam $L_0$ is reduced as this beam emerges from the output surface 52 of prism 53. Beam $L_0$ with the reduced diameter is applied to a half mirror 54. A laser beam $L_1$ reflected by half mirror 54 is applied to a first photodetector 56 through a first projection lens 55. On the other hand, the laser beam $L_2$ passing through half mirror 54 is shielded by a shield 57 and is applied to a second photodetector 59 through a second projection lens 58.

Figure 9:
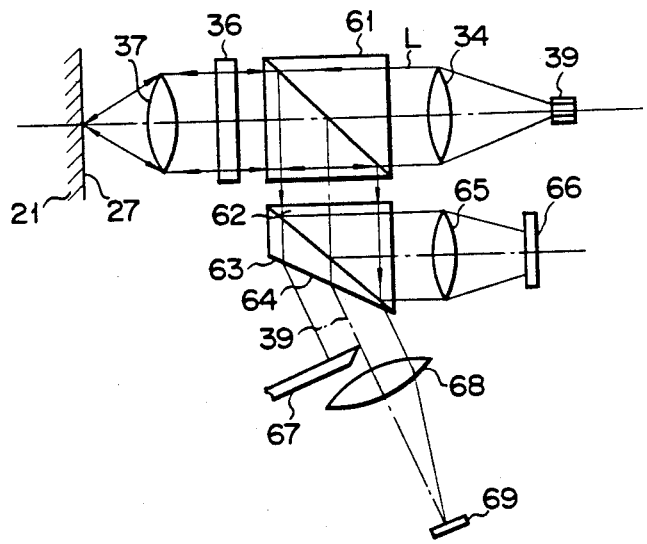

FIG. 9 shows the third embodiment of the present invention. In this embodiment, the laser beam L reflected from a polarizing beam splitter 61 is applied to a half mirror 62. Half mirror 62 designed to split beam L into two beams $L_1$ and $L_2$ has two light-emerging surfaces. A prism 64 is attached to light-emerging surface 63. Hence, beam $L_1$ reflected from mirror 62 is applied through a first projection lens 65 to a first photodetector 66. Beam $L_2$ passing through half mirror 62 is refracted by prism 64 as it emerges from prism 64. The diameter of beam $L_2$ is reduced as beam $L_2$ is refracted. Laser beam $L_2$ is shielded by a shield 67 and is applied to a second photodetector 69 through a second projection lens 68.

Figure 10:
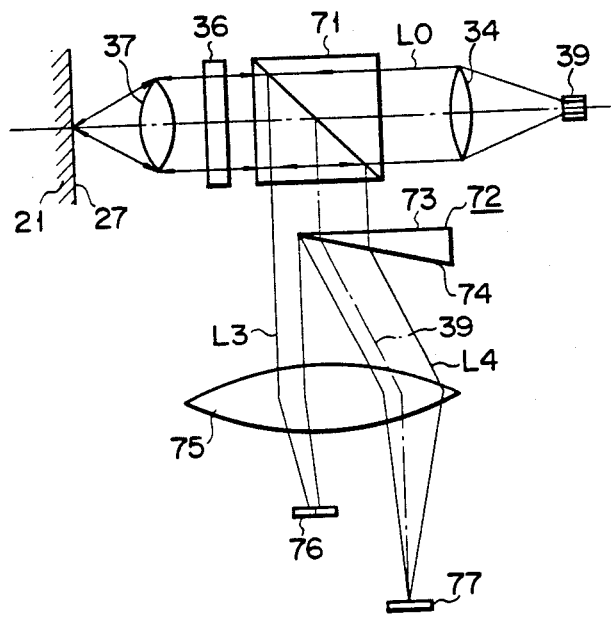

FIG. 10 shows the fourth embodiment of the present invention. In this embodiment, a prism 72 is arranged in the path of a beam L reflected from a polarizing beam splitter 71. Prism 73 has an input surface 73 at right angles to the axis 39 of beam L and an output surface 74 inclined at a small angle thereto. It is positioned such that a portion $L_3$ of beam L is applied to a first photodetector 76 through a projection lens 75, while the other portion $L_4$ is applied to a second photodetector 77 through prism 72 and projection lens 75. Beam $L_4$ is refracted by prism 72, and its diameter is reduced.

Figure 11:
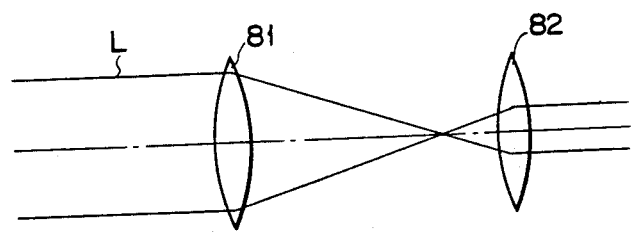

FIG. 11 shows the fifth embodiment of the present invention. This embodiment has two convex lenses 81 and 82 arranged in the path of a laser beam L between an objective lens and a projection lens. These lenses are used to reduce the diameter of beam L.

Figure 12:
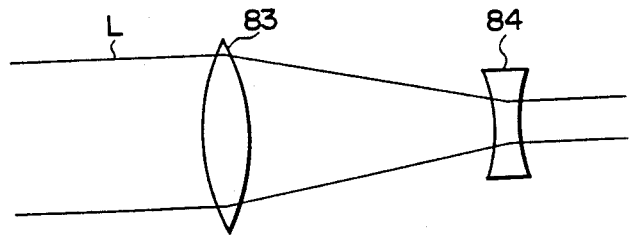

FIG. 12 shows the sixth embodiment of the present invention. The embodiment has a convex lens 83 and a concave lens 84, both arranged in the path of a laser beam L between an objective lens and a projection lens. Lenses 83 and 84 cooperate to reduce the diameter of beam L.

The second to sixth embodiments have the same advantages as the first embodiment.

The projection lens used in each embodiment may be replaced by two cylindrical convex lenses or by one cylindrical convex lens and one cylindrical concave lens.

In the fifth embodiment (FIG. 11) and the sixth embodiment (FIG. 12), the diameter of the laser beam is reduced, but the cross sectional shape thereof remains unchanged. In contrast, in the other embodiments, the size of the beam spot is reduced only in one direction, changing the circular beam spot to an elliptical one.

As mentioned above, according to this invention, a laser beam having a diameter smaller than the parallel beam applied to the objective lens is applied to the projection lens. Therefore, the optical head is small and can accurately determine the focusing condition of the laser beam.

What is claimed is:

1. An optical head for focusing a light beam on an information recording layer, comprising:

light source means for emitting a light beam;

objective lens means for converging the light beam emitting from the light source, applying the light beam to the information recording layer and transferring the light beam reflected from the information recording layer, said objective lens means forming a focused beam spot corresponding to a beam waist of said light beam on the information recording layer when said light beam is accurately focused on the information recording layer, and for forming a beam spot larger than said focused beam spot on the information recording layer when said light beam is inaccurately focused on the information recording layer;

means for reducing, in a predetermined direction, the size of the light beam transferred from the objective lens means;

first photodetecting means with first and second photosensitive regions on which the transferred light beam is applied; and means for shielding a portion of the light beam reduced in said predetermined direction in accordance with the distance between the objective lens means and information recording layer, thereby applying the light beam to the first and second photosensitive regions when it is accurately focused on the information recording layer and to only one of the first and second photosensitive regions when it is inaccurately focused on the information recording layer.

2. An optical head according to claim 1, wherein said reducing means changes the shape of the light beam into an elongated shape extending in a predetermined direction.

3. An optical head according to claim 2, wherein said reducing means is a refractive prism which refracts the light beam.

4. An optical head according to claim 3, wherein said refractive prism splits the light beam into first and second components which travels in different directions.

5. An optical head according to claim 1, further comprising means for splitting the light beam applied from said objective lens into first and second beam components, and a second photodetecting means with first and second photosensitive regions for receiving the second converged beam component.

6. An optical head according to claim 5, wherein said information recording layer has a tracking guide, and further comprising means connected to the first and second photosensitive regions of said second photodetecting means for generating a tracking signal showing whether or not the applied light beam is accurately tracing the tracking guide, and means for moving said objective lens with respect to the information recording layer in accordance with the tracking signal.

7. An optical head according to claim 1, wherein said deflecting means comprises a light-shielding plate arranged between said objective lens means and said first photodetecting means.

8. An optical head according to claim 1, further comprising an optical system including a quarter-wave plate and a polarizing beam splitter, said optical system being arranged between said light source means and said objective lens means for allowing the passage of the light beam travelling from said light source to said objective lens means and reflecting and applying the light beam from said objective lens means to said first photodetecting means.

9. An optical head according to claim 8, wherein said polarizing beam splitter comprises first and second refractive prisms connected to each other.

10. An optical head according to claim 1, wherein the first and second photosensitive regions of said first photodetecting means are placed in an image forming plane where an image of the beam spot is formed by an optical system provided between the information recording layer and said first photodetecting means when the light beam is accurately focused on the information recording layer.

11. An optical head according to claim 1, further comprising means connected to the first and second photosensitive regions of said first photodetecting means for generating, in accordance with electrical signals produced by these regions, a focus signal showing whether or not the light beam is accurately focused on the information recording layer, and means for moving said objective lens along the optical axis of the objective lens in accordance with the focus signal.

12. An optical head according to claim 1, wherein said reducing means is a combination lens system.

13. An optical head according to claim 1, further comprising means for converging the transferred light beam, which is located between said objective lens and said first photodetecting means.

14. An optical head according to claim 12, wherein said combination lens system includes a cylindrical lens.

15. An optical head according to claim 1, wherein said reducing means changes the beam shape along a direction in which the light beam is deflected by said deflecting means.

16. An optical head according to claim 6, wherein said reducing means changes the beam shape in a direction along which an image of the tracking guide extends.

17. A method for detecting the focusing condition of a light beam incident on an information recording layer, comprising the steps of:
  emitting a light beam;
  converging, with objective lens means, the emitted light beam;
  applying, with said objective lens means, the converged light beam to the information recording layer such that said light beam forms a focused beam spot corresponding to its beam waist on the information recording layer when it is accurately focused on the information recording layer, but forms a beam spot larger than said focused beam spot on the information recording layer when it is inaccurately focused on the information recording layer;
  transferring, with said objective lens means, the light beam reflected from the information recording layer;
  reducing the size of the transferred light beam in a predetermined direction;
  directing the reduced transferred light beam to a first photodetecting means having first and second photosensitive regions; and
  shielding the reduced transferred light beam in said predetermined direction in accordance with the distance between the objective lens means and said information recording layer, thereby applying the reduced transferred light beam to the first and second photosensitive regions when it is accurately focused on the information recording layer, but to only one of the first or second photosensitive regions when it is inaccurately focused on the information recording layer.

18. A method according to claim 17 wherein said shielding step includes the step of shielding said reduced transferred light beam with a light-shielding plate arranged between said objective lens means and said first photodetecting means.

19. A method according to claim 17 wherein said reducing step includes the step of splitting the light beam applied from said objective lens into first and second beam components, and further including the step of directing said second beam component to a second photodetecting means having first and second photosensitive regions.

20. A method according to claim 19 further including the steps of:
  generating a focusing signal from said first photodetecting means, said focusing signal indicative of the focusing condition of said light beam on said information recording layer;
  generating a tracking signal from said second photodetecting means, said tracking signal indicating whether the light beam applied to said information recording layer is accurately tracking a tracking guide on said information recording layer; and
  moving said objective lens means in accordance with at least one of the focusing and tracking signals.

* * * * *